UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS OF MANUFACTURING SODIUM PERBORATE.

No. 842,470.                Specification of Letters Patent.         Patented Jan. 29, 1907.

Application filed February 7, 1906. Serial No. 299,901.

*To all whom it may concern:*

Be it known that I, OTTO LIEBKNECHT, a subject of the German Emperor, and a resident of Frankfort-on-the-Main, Germany, have invented certain new and useful Improvements in the Process of Manufacturing Sodium Perborate, of which the following is a specification.

My invention relates to a new process for the manufacture of sodium perborate which has proved easy in operation and of a high degree of efficiency.

I have discovered that if an alkali peroxid, such as sodium peroxid, in solution or in suspension in water is treated with boracic acid or an alkali borate, such as borax and carbonic acid, or an alkali bicarbonate, such as sodium bicarbonate, sodium perborate is formed and precipitated in an alkaline solution. This reaction is not the one to be expected, as sodium perborate and sodium carbonate might have formed sodium percarbonate and sodium metaborate, whereas according to my process besides the sodium perborate a pure concentrated solution of sodium carbonate is obtained, which can be used for other purposes.

In the following I have described two methods as illustrations of ways of carrying out my process, the features thereof being more particularly pointed out hereinafter in the claims.

The following examples will clearly illustrate two ways of carrying out my process.

1. Six hundred and thirty parts of boracic acid are stirred into four thousand parts of water, and then seven hundred and eighty parts of sodium peroxid are added, together with sufficient ice so that no increase in temperature takes place. Then gradually add nine hunderd and fifty parts of sodium bicarbonate in powdered form and at the same time ice-water or ice in such quantities that at the end of the operation the temperature of the mixture is preferably from 0° to 2° centigrade, and the amount of liquid is about fourteen thousand parts. It is preferable to stir the mixture during the entire operation. After the reaction is completed the precipitated perborate may be separated from the sodium-carbonate solution, washed out, and dried in the usual manner.

2. One hundred and fifty-six parts of sodium peroxid are stirred into about four hundred parts of water, sufficient ice being added to avoid an increase in temperature. Then one hundred and ninety-five parts of borax ($Na_2B_4O_7 + 10H_2O$) are added and carbonic acid or dust-free waste gases containing carbonic acid are passed into the mixture until fifty cubic centimeters of a filtered sample discolors but five to ten cubic centimeters of a one-fifth normal potassium-permanganate solution after an addition of sulfuric acid. A surplus of carbonic acid is not harmful, as the same does not decompose the already-formed perborate. The further steps of the operation may be carried out as in the example numbered 1.

In the examples stated as illustrative of means of carrying out the process it is obvious that many variations may be practiced without departing from the spirit of my invention. For instance, sodium peroxid may be replaced by other alkali peroxid, such as sodium-potassium peroxid or potassium peroxid, as long as there is enough sodium in the form of a salt present to produce sodium perborate as a result of the reaction. Instead of boracic acid or borax other alkali borates may be used, and instead of sodium bicarbonate or carbonic acid other alkali bicarbonates, such as potassium bicarbonate, may be used. I do not restrict myself to the proportions stated or to the particular substances named.

What I claim, and desire to secure by Letters Patent of the United States, is—

1. The process of manufacturing sodium perborate which consists in reacting on a boron compound with an alkali peroxid and carbon dioxid.

2. The process of manufacturing sodium perborate which consists in reacting on an alkali borate with an alkali peroxid and carbon dioxid.

3. The process of manufacturing sodium perborate which consists in reacting on borax with an alkali peroxid and carbon dioxid.

4. The process of manufacturing sodium perborate which consists in reacting on a boron compound with sodium peroxid and carbon dioxid.

5. The process of manufacturing sodium perborate which consists in reacting on an alkali borate with sodium peroxid and carbon dioxid.

6. The process of manufacturing sodium perborate which consists in reacting on borax with sodium peroxid and carbon dioxid.

In testimony whereof I have signed my name to this specification in the presence of two subscribing witnesses.

OTTO LIEBKNECHT.

Witnesses:
  HORST ZIEGLER,
  JEAN GRUND.